Dec. 5, 1967

F. MIRUS 3,356,161

TAIL WHEEL REVERSING MECHANISM FOR SPINNER
PLOWS (GRAVITY ACTUATED LATCHED)

Filed Jan. 21, 1965

Inventor
Ferdinand Mirus
By Kenneth C. Hackett
Attorney

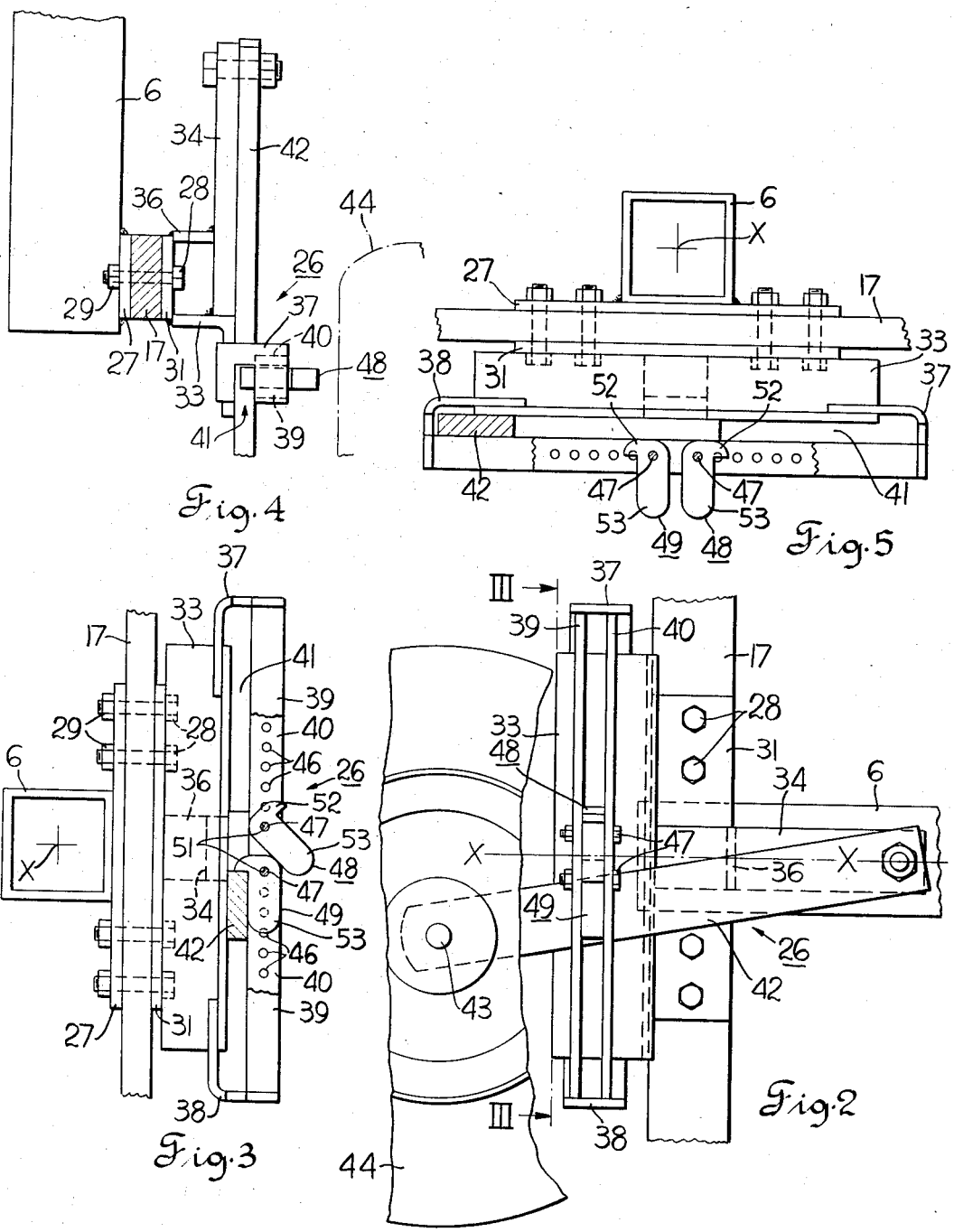

United States Patent Office 3,356,161
Patented Dec. 5, 1967

3,356,161
TAIL WHEEL REVERSING MECHANISM FOR SPINNER PLOWS (GRAVITY ACTUATED LATCHED)
Ferdinand Mirus, Ojai, Calif., assignor to Allis-Chalmers Manufacturing Company, Milwaukee, Wis.
Filed Jan. 21, 1965, Ser. No. 427,006
4 Claims. (Cl. 172—212)

ABSTRACT OF THE DISCLOSURE

This disclosure relates to a spinner plow tail wheel which functions as a gauge for both sets of plows.

---

Figure 1:
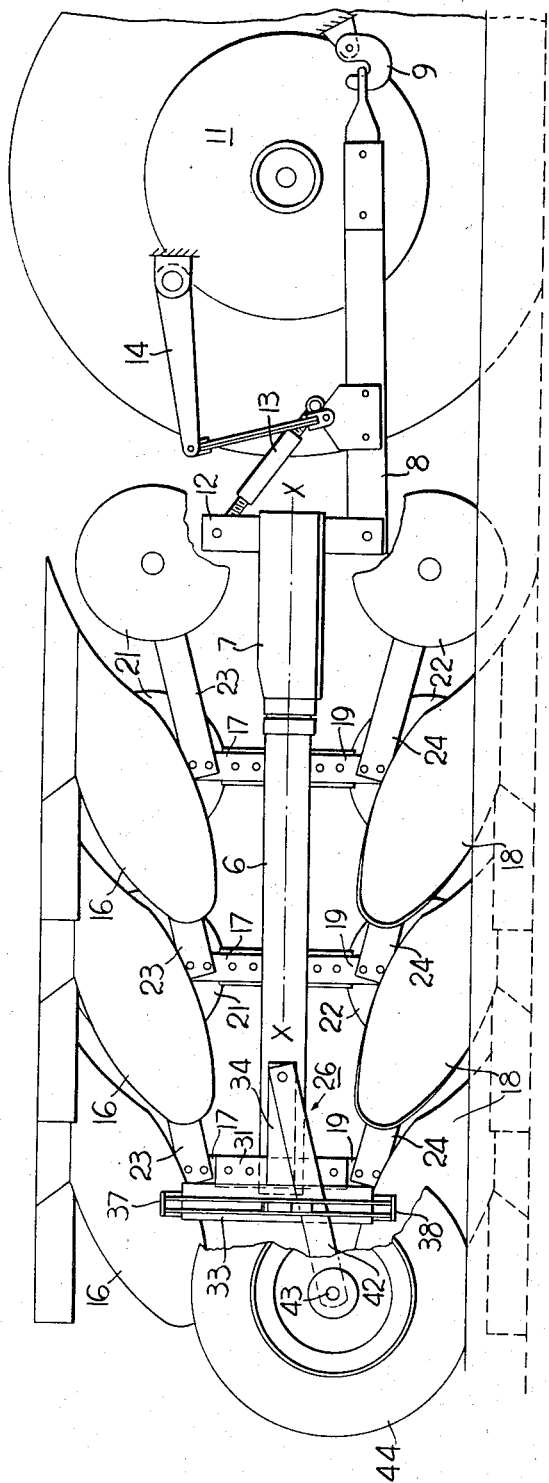

This invention relates to two-way plows and particularly to a two-way plow of the roll-over type wherein right and left hand plowing units are mounted on a support extending longitudinally of the directions of travel of the plow and rotatable about the axis thereof to place the plow units alternately in operative position. Specifically the invention concerns a novel gauge wheel latching mechanism which automatically positions and latches the gauge wheel in proper relation to the plow unit that has been positioned in operative position.

Another object of this invention is the provision in a two-way plow of the roll-over type, of a mounting for a single gauge wheel adapted to function as a gauging means for each of the alternating plow units wherein novel gravity operated latch means are provided for automatically locking the gauging wheel in its operative position.

Another object of this invention is to provide a novel latching means for a two-way plow of the roll-over type wherein such means are easy to construct, easy to service positive acting and are relatively trouble free.

Other objects and advantages of this invention will become clear from the following detailed description when read in conjunction with the accompanying drawings in which:

FIG. 1 is a side elevation view partly in section of a tractor mounted two-way plow embodying this invention;
FIG. 2 is an enlarged portion of FIG. 1;
FIG. 3 is a view taken on line III—III of FIG. 2;
FIG. 4 is a plan view of the invention as shown in FIG. 3; and
FIG. 5 is a view similar to FIG. 3 showing the parts when rotated about the axis X through 90 degrees clockwise.

The general construction of a two-way plow having a gauge wheel embodying this invention is shown in FIG. 1 and includes a longitudinally extending rotatable tool carrier or support 6, the forward end of which is rotatably mounted in a housing 7 having a hitch structure 8 at its forward end adapted for attachment to suitable implement attaching apparatus 9 on tractor 11. An upright 12 mounted on housing 7 is also connected by a turnbuckle 13 to the hitch structure 8 as a means for adjusting the longitudinal aspect of tool carrier 6 relative to hitch structure 8.

Tool carrier 6 is revolved about its longitudinal axis in housing 7 by power means (not shown) such as a hydraulic motor carried in housing 7 and operatively connected to tractor 11 for actuation thereby. Tractor 11 is provided with a pair of hydraulically actuated lift arms 14 which are operatively connected to hitch structure 8 for raising and lowering same.

This invention is shown as applied to a three bottom two-way plow wherein the rotatable member 6 constitutes the support for the plows. As shown in FIG. 1, three plows 16 are a left hand plow unit and are shown in their inoperative position. Each of these plows is attached to carrier 6 by means of a vertically extending beam 17. Three plows 18 are a right hand plow unit and are shown in their operative position and each of these plows are attached to carrier 6 at low portion 19 of beam 17. Colters 21 and 22 are provided for each of the plows 16 and 18 respectively, and such colters are adjustably connected to beams 17 by members 23 and 24, respectively.

Referring to FIGS. 2 and 3, adjacent the rear end of tool carrier 6, a gauge wheel assembly 26 is attached thereto for rotation therewith, including plate 27 attached to carrier 6 as by welding. Plow beam 17 is attached to plate 27 by means of bolts 28, nuts 29 and plate 31 which is interposed between beam 17 and the heads of bolts 28. Bolts 28 pass through apertures (not shown) in beam 17, plates 27 and 31. An angle iron 33 is attached to plate 31 as by welding (see FIG. 4). A longitudinally extending support member 34 is welded at one end to angle iron 33 and is rigidly attached to plate 31 by means of a strap 36 welded at its ends to plate 31 and support member 34. Also welded to angle iron 33 adjacent the ends thereof are L-shaped members 37 and 38 which have attached thereto a pair of vertically extending transversely spaced apart members 39 and 40 positioned in longitudinally spaced relation to angle iron 33 to provide a slot 41. The distal end of support member 34 pivotally supports an arm 42 which has its midportion received in slot 41. The width of slot 41 and arm 42 being such that arm 42 can move vertically in slot 41 but is prevented from sideward motion or in other words slot 41 restricts arm 42 to linear movement along the slot. The distal end of arm 42 is provided with a shaft 43 rotatably supporting gauge wheel 44.

Members 39 and 40 are provided with vertically aligned transverse apertures 46 for receiving pivot bolts 47 as is shown in FIG. 3. A pair of latch members 48 and 49 are pivotally mounted on bolts 47 between members 39 and 40. These latch members are generally inverted L-shaped and are provided with apertures 51 at a point adjacent the juncture of the short leg 52 and the long leg 53 of latch members 48 and 49. Latch members 48 and 49 are identical in configuration. As shown in FIG. 3 latch member 48 is mounted with its short leg extending to the right whereas lower latch member 49 is pivotally mounted with its short leg extending toward the left.

From the longitudinal axes X—X of tool carrier 6, the apertures 46 above this axis are spaced therefrom the same distance as the corresponding apertures below the axis to thus provide equal selective gauging. As is shown in FIG. 3 pivot bolts 47 are equally spaced from axis X—X. If less depth of plowing were desired the latches could be repositioned in a different set of apertures. To maintain the same depth of plowing for each set of plows 16 and 18, it is necessary that ony position of the upper pivot bolt must be matched with a like position of the lower bolt; i.e., the pivot points must be the same distance from axis X—X.

The operation of this gravity latch gauging wheel is as follows:

Assume the plow is in the position shown in FIG. 1, the hydraulic lift system (not shown) of tractor 11 is actuated to lift arms 14 thereby raising the entire plow assembly off of the ground.

Referring to FIG. 2, during this lifting process arm 42 with gauge wheel 44 thereon, drops down away from latch 49. When the plow and gauge wheel are clear of the ground, the mechanism (not shown) for rotating tool carrier 6 is actuated. When tool carrier 6 has been rotated 90 degrees, the latches 48 and 49 will assume a position as shown in FIG. 5 wherein the short legs of latches 48 and 49 have their upper surfaces just contacting slot 41 but not extending thereinto. Upon further rotation of carrier 6, arm 42 slides, as a result of gravity, in slot 41 over latches 48 and 49 until carrier 6 has been rotated approximately 180 degrees. At this point rotation of the carrier is stopped and arm 42 is in contact with member 37 at the bottom of slot 41 and latch 48 has pivoted, through gravitational action, to a position wherein the short leg of latch 48 overhangs slot 41. Now, when the plow carrier 6 is lowered, upward movement of arm 42 and its attached gauge wheel, resulting from the gauge wheel contacting the ground, is prevented from movement beyond latch 48 because such upward movement of arm 42 causes arm 42 to contact the short leg 52 of latch 48 thereby causing a jamming movement of the long leg 53 of latch 48 against the side of arm 42 and thereby presenting plow 16 in position to operate at a preselected depth.

When it is desired to reverse the plows again at the end of the field, the same procedure is followed, that is the plows are raised and the carrier is reversely driven through 180 degrees.

It is therefore seen that a simple positive acting latching arrangement has been provided making possible the use of one gauging wheel for both sets of plows in a two-way plow.

This invention has been described in its preferred embodiment and modifications may be made in the invention without departing from the spirit thereof or the scope of the appended claims.

The embodiments of the invention for which an exclusive property or privilege is claimed are defined as follows:

1. For use with a two-way plow of the type including a support having right and left hand plow units mounted thereon and rotatable about a longitudinal axis to place the plows alternately in operation: a common gauge wheel for both units and means for mounting said wheel on the support for rotation therewith, comprising a longitudinally extending member secured to said support, a wheel carrying arm pivotally mounted on said member, said arm and wheel unit being rotatable bodily with the support from a gauging position relative to the operating plow unit to a raised position when the alternate plow unit is moved to operating position, said arm and wheel being swingable by gravity downwardly over said member to an operating position with respect to the alternate plow unit, guide means secured to said support for guiding said arm and comprising a slotted element secured to said support at right angles to said longitudinal axis and said arm is movable in the slot of said element when said plows are alternated to operating position, a pair of spaced apart latch members pivotally attached to said guide means and being alternately operable to restrain said gauge wheel from moving upwardly, said latch member being inverted L-shaped in configuration and pivotally attached to said guide means at a point adjacent to the joinder of the legs of said inverted L-shape so the shorter leg of one of said latches extends into said slot to prevent retrograde movement of said arm assisted by a side pressure against said arm provided by the longer leg of said one latch.

2. The combination recited in claim 1 and wherein said latches being so configured that when said slot is in a vertical position the lower latch will be positioned with the shorter leg thereof extending into said slot and the longer leg extending parallel to said slot in contiguous relation thereto and the upper latch will be positioned with the shorter leg thereof extending away from said slot and the longer leg extending parallel to said slot in contiguous relation thereto.

3. The combination recited in claim 2 and wherein said latch members are adjustable as to position along said guide for providing a desired depth of plowing.

4. In a two-way plow of the type including a support having right and left hand plow units mounted thereon by means of radially extending beams about a longitudinal axis to place the plow units alternately in operation, a common gauge wheel for both units and means for mounting said wheel on said support for rotation therewith comprising an element attached to said support and extending parallel to the beam members of said plows and being provided with a slot therein extending parallel to said beams; a forwardly extending support member attached at one end to said element, an arm pivotally connected at one end to the other end of said element, said gauge wheel being pivotally mounted on an axle attached to the other end of said arm, a midportion of said arm being positioned in said slot for guiding said arm in the plane of said slot, a pair of spaced apart latch members pivotally mounted on said element, said latch members alternately coacting with said arm for retaining said wheel in its gauging position with said plows, said latch members being so configured that when said element is rotated with said support to a horizontal position said latches by reason of gravity actuation assume a position out of contact with said arm and when said element is further rotated to a vertical position, the lower of said latches is so positioned by gravity actuation that said arm may descend by gravity actuation in said slot down past said lower latch and said lower latch prevents movement upward of said arm in said slot beyond said lower latch, said latch members being so configured that when said arm has moved downwardly past said latch an upper portion of said latch prevents upward movement of said arm and the upward pressure exerted by said latch is transmitted by the upper portion of said latch to a side portion of said latch which is in contact with the side portion of said latch which is in contact with the side portion of said arm and thereby preventing further upward pivotal movement of said arm, and said latch members are provided with inverted L-shaped configuration with the pivot axis thereof extending through each latch at a point adjacent the connection between the upper and lower portions of said latch, the upper transverse portion of the latch extends into said slot so that when the arm descends upon such latch the upper portion of the latch is pivoted out of the way of said arm permitting the arm to move past the latch, upon subsequent upward movement of the arm, the arm upon contacting the upper portion of the latch pivots same causing the lower vertical portion of the latch to pivot into contact with the side of said arm preventing further upward movement thereof.

References Cited
UNITED STATES PATENTS

| | | | |
|---|---|---|---|
| 2,773,439 | 12/1956 | Chandler | 172—224 |
| 3,013,618 | 12/1961 | Zeltwanger | 172—212 |
| 3,128,832 | 4/1964 | Habare | 172—212 X |

OTHER REFERENCES
German printed application 1,056,409, April 1959.

ABRAHAM G. STONE, *Primary Examiner.*

J. R. OAKS, *Assistant Examiner.*